United States Patent
Lee et al.

(10) Patent No.: US 7,667,766 B2
(45) Date of Patent: Feb. 23, 2010

(54) ADJUSTABLE SPECTRUM FLASH LIGHTING FOR IMAGE ACQUISITION

(75) Inventors: Kian Shin Lee, Penang (MY); Janet Bee Yin Chua, Penang (MY); Yue Hoong Lau, Penang (MY); Teoh Teh Seah, Serunal (SG); Joon Chok Lee, Sarawak (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 972 days.

(21) Appl. No.: 10/742,310

(22) Filed: Dec. 18, 2003

(65) Prior Publication Data

US 2005/0134723 A1 Jun. 23, 2005

(51) Int. Cl.
*H04N 5/222* (2006.01)
*G03B 15/03* (2006.01)
(52) U.S. Cl. .................. 348/370; 348/371; 396/155
(58) Field of Classification Search .............. 348/370, 348/371; 362/11, 231, 260; 396/155, 176; 257/89, 98
See application file for complete search history.

(56) References Cited

U.S. PATENT DOCUMENTS

| | | | |
|---|---|---|---|
| 5,016,046 A | 5/1991 | Nishiyama | |
| 5,067,049 A | 11/1991 | Milaire | |
| 5,117,118 A | 5/1992 | Fukuyama | |
| 5,477,326 A | 12/1995 | Dosmann | |
| 5,722,755 A | 3/1998 | Slape | |
| 5,758,942 A | 6/1998 | Fogal et al. | |
| 5,815,204 A | 9/1998 | Abe et al. | |
| 5,895,128 A | 4/1999 | Kishimoto et al. | |
| 5,909,245 A | 6/1999 | Aoki et al. | |
| 6,277,301 B1 | 8/2001 | Hohn et al. | |
| 6,344,641 B1 | 2/2002 | Blalock et al. | |
| 6,379,022 B1 | 4/2002 | Amerson et al. | |
| 6,448,550 B1 | 9/2002 | Nishimura | |
| 6,501,091 B1 | 12/2002 | Bawendi et al. | |
| 6,636,003 B2 | 10/2003 | Rahm et al. | |
| 6,664,556 B2 | 12/2003 | Doberenz | |
| 6,781,329 B2 | 8/2004 | Mueller et al. | |
| 6,803,719 B1 | 10/2004 | Miller et al. | |
| 6,864,749 B2 | 3/2005 | Seetharaman et al. | |
| 6,885,405 B1 * | 4/2005 | Steinberg et al. | ............ 348/371 |
| 6,894,266 B2 | 5/2005 | Richard et al. | |
| 6,909,377 B2 | 6/2005 | Eberl | |

(Continued)

FOREIGN PATENT DOCUMENTS

DE 100 31 303 A1 1/2002

(Continued)

OTHER PUBLICATIONS

GB Search Report Under Section 17 dated Feb. 16, 2005; 2 pages.

(Continued)

*Primary Examiner*—Kelly L Jerabek (57) ABSTRACT

A light module associated with the camera provides flash light having a spectral content that is adjustable according to one or more drive signals. The light module includes one or more emitters of light of at least two different colors that are individually accessible to the one or more drive signals. The flash light is a mixture of the light from the one or more emitters.

19 Claims, 5 Drawing Sheets

U.S. PATENT DOCUMENTS

| | | |
|---|---|---|
| 7,005,667 B2 | 2/2006 | Chen et al. |
| 7,102,152 B2 | 9/2006 | Chua et al. |
| 7,106,378 B2 | 9/2006 | Kawakami |
| 7,178,941 B2 | 1/2007 | Roberge et al. |
| 7,318,651 B2 * | 1/2008 | Chua et al. .................. 362/11 |
| 2002/0025157 A1 * | 2/2002 | Kawakami ................. 396/155 |
| 2002/0118967 A1 * | 8/2002 | Funston ..................... 396/155 |
| 2002/0191102 A1 | 12/2002 | Yuyama et al. |
| 2003/0052992 A1 | 3/2003 | Nakata |
| 2003/0123873 A1 | 7/2003 | Okubo |
| 2003/0127659 A1 | 7/2003 | Bawendi et al. |
| 2003/0127660 A1 | 7/2003 | Bawendi et al. |
| 2003/0180037 A1 | 9/2003 | Sommers |
| 2003/0216151 A1 * | 11/2003 | Kitano et al. ............ 455/556.1 |
| 2004/0245912 A1 | 12/2004 | Thurk et al. |
| 2005/0134723 A1 | 6/2005 | Lee et al. |
| 2005/0135079 A1 | 6/2005 | Yin Chua et al. |
| 2005/0199784 A1 | 9/2005 | Jaffar et al. |
| 2006/0002110 A1 | 1/2006 | Dowling et al. |
| 2006/0176692 A1 | 8/2006 | Lee et al. |

FOREIGN PATENT DOCUMENTS

| | | |
|---|---|---|
| DE | 10055767 | 8/2002 |
| DE | 102 61 365 A1 | 7/2004 |
| DE | 102 61 428 A1 | 7/2004 |
| EP | 1 160 883 A2 | 12/2001 |
| EP | 1 176 849 A2 | 1/2002 |
| EP | 1 369 935 A1 | 12/2003 |
| EP | 1 176 849 | 9/2004 |
| GB | 2 253 718 A | 9/1992 |
| JP | 2003 007103 | 1/2003 |
| JP | 2003 066519 | 3/2003 |
| JP | 2003 215 675 | 7/2003 |
| JP | 2005-11628 A | 1/2005 |
| JP | 2006-25167 A | 1/2006 |
| WO | WO 2004/060024 A1 | 7/2004 |

OTHER PUBLICATIONS

German Office Action dated Jan. 31, 2007 involving German Application No. 10 2005 058 877.8-42 (co-pending application).

English translation of German Office Action dated Jan. 31, 2007 involving German Application No. 10 2005 058 877.8-42 (co-pending application).

German Office Action dated Mar. 28, 2006 involving German Application No. 10 2005 045 106.3-33 (co-pending application).

English translation of German Office Action dated Mar. 28, 2006 involving German Application No. 10 2005 045 106.3-33 (co-pending application).

U.K. Search Report dated Jun. 1, 2006 involving U.K. Application No. GB0602430.1 (co-pending application).

Evident Technologies, Nanomaterials Catalog v5.0, Nanomaterial Products (Aug. 2004), pp. 1-12.

* cited by examiner

ADJUSTABLE SPECTRUM FLASH
LIGHTING FOR IMAGE ACQUISITION

BACKGROUND OF THE INVENTION

Strobed light sources or "flashes" provide supplemental light for photographic subjects while images of the subjects are acquired by a camera or other imaging system. One common type of flash includes a xenon bulb that emits light based on the discharge of xenon gas. The spectral content of this light is fixed by the characteristics of the gas discharge, which in turn fixes the color temperature of the supplemental lighting for the photographic subject. Another type of flash, included with the cameras integrated into mobile phones, comprises one or more "white" LEDs. The "white" LEDs are typically formed using one or more blue LEDs (primary emitters) with phosphors (secondary emitters) deposited on the blue LEDs. The spectral content of the light emitted by the "white" LEDs is also fixed, depending on the spectral characteristics of the primary emitters and the emission characteristics of the deposited secondary emitters, which fixes the color temperature of the "white" LEDs typically in the range of 5500-8500 degrees Kelvin.

The characteristics of images acquired by an imaging system depend on the spectral content or the color temperature of the light. When the spectral content of the flash is fixed, desired image characteristics can be achieved by mounting color filters on the lens of the camera. However, this provides only limited control of image characteristics because the filters do not provide continuous control of the spectral content of the light received by the camera. In addition, the filters are inconvenient to use because to achieve different spectral filtering, the filters must be physically interchanged.

Based on the fixed spectra of presently available flashes and the limitations of filters used to modify spectral content of available light, there is a need for a flash that provides light with a spectral content that can be adjusted.

SUMMARY OF THE INVENTION

An imaging system according to the embodiments of the present invention includes a light source that provides flash light that has a spectral content that is adjustable.

DETAILED DESCRIPTION OF THE
EMBODIMENTS

Figure 1:
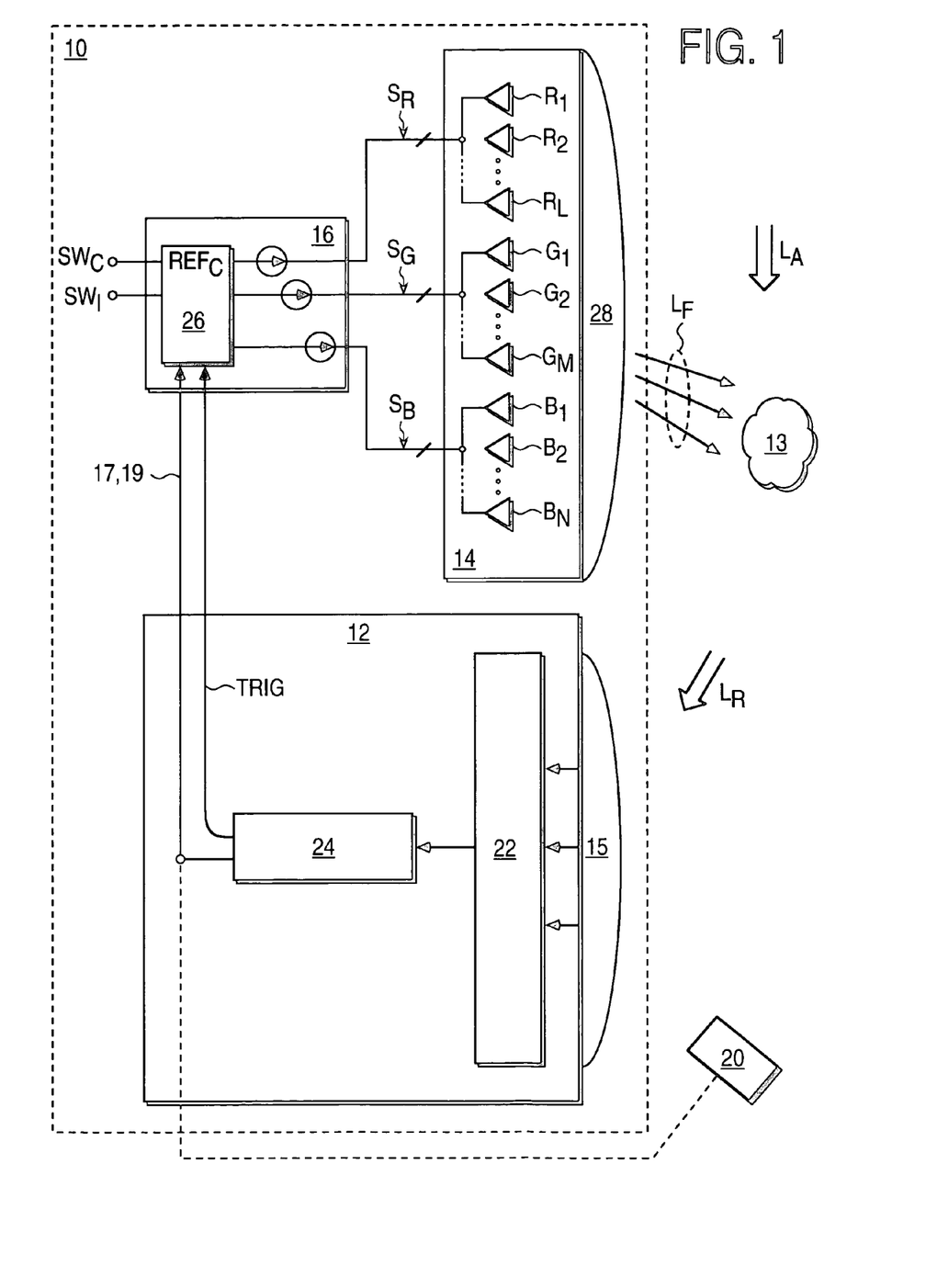
FIG. 1 shows a block diagram of an imaging system according to the embodiments of the present invention.

FIG. 1 shows a block diagram of an imaging system 10 according to embodiments of the present invention. The imaging system 10 includes a camera 12 and a light module 14 associated with the camera 12. The light module 14 has a series of emitters of light of at least two different colors, where the emitters are indicated as $R_1$-$R_L$, $G_1$-$G_M$, $B_1$-$B_N$. The subscripts L, M, N are integers that represent the number of red emitters, blue emitters and green emitters, respectively. In a typically application, the number of emitters of each color is equal.

In this example, the different colors are red, green and blue, although emitters of other colors are alternatively used to provide a sufficiently wide spectral content adjustment range. A driver 16 provides drive signals $S_R$, $S_G$, $S_B$ to these different color emitters $R_1$-$R_L$, $G_1$-$G_M$, $B_1$-$B_N$, respectively. By varying the drive signals corresponding to the different color emitters in the series, the spectral content of flash light $L_F$ provided by the light module 14, which is a mixture of the light provided by the different color emitters, can be correspondingly varied.

In one example, the camera 12 is a digital camera that includes an array of sensors 22 positioned behind a lens or other focusing element 15. Typically, the sensors 22 are CMOS detectors, photodiodes or other transducers that convert received light $L_R$ light to electrical signals that can be processed by a processor 24 to produce an image of a subject 13. In another example, the camera 12 is film-based wherein photographic film is positioned behind the focusing element 15 as the sensor 22. Typical cameras of this type accommodate daylight film that is balanced for bluish light having a color temperature of 5500 Kelvin for example. Alternatively, these cameras accommodate tungsten film that is balanced for orange or warmer light having a color temperature of 3200 Kelvin for example. The processor 24 coupled to the sensor 22 within the camera 12 performs image processing or other control functions to acquire images of the subject 13.

Images acquired by the camera 12 in the absence of flash light $L_F$ provided by the light module 14 are dependent on the spectral content or color temperature of the ambient light $L_A$. Film-based cameras are especially sensitive to the color temperature of the ambient light $L_A$. For example, ambient light $L_A$ that is warm, such as that provided by stage lights or household lighting, generally casts an orangey image on daylight film. Ambient light $L_A$ that is cooler (for example daylight) generally photographs bluish on tungsten film. The adjustable spectral content of supplemental lighting $L_S$ of the subject 13 provided by the light module 14 can provide color balancing to help to neutralize the light $L_A$, or otherwise accommodate for an undesired color content or color temperature of the ambient light $L_A$ illuminating the subject 13. The spectral content of the flash light $L_F$ provided by the light module 14 can also be adjusted to achieve a desired photographic effect. For example, providing flash light $L_F$ that is cooler when the subject 13 is a dark-skinned human generally results in an acquired image wherein the skin appears to be lighter, whereas providing a warmer light to this subject 13 results in an acquired image wherein the skin appears to be a richer tan color. In addition to these particular examples, a variety of image characteristics and effects can be achieved via adjustments of the spectral content of the flash light $L_F$ provided by the light module 14 to the subject 13.

In one embodiment, the emitters of the light module 14 are solid state light sources such as laser diodes or LEDs (light emitting diodes). However, the series of emitters includes any other light sources of two or more different colors, or any suitable light source that has a spectral content that is adjustable. The emitters of different colored light in the light module 14 are independently accessible. In one example, the series of emitters $R_1$-$R_L$, $G_1$-$G_M$, $B_1$-$B_N$ includes an array of one or more red emitters $R_1$-$R_L$, such as red LEDs, one or more green emitters $G_1$-$G_M$, such as green LEDs, and one or more blue emitters $B_1$-$B_N$, such as blue LEDs. Red, green and blue are readily available LED colors and when the output light from these LEDs is mixed, the emitters $R_1$-$R_L$, $G_1$-$G_M$, $B_1$-$B_N$ provide adequate coverage of the color space for the resultant flash light $L_F$.

Figure 5A:
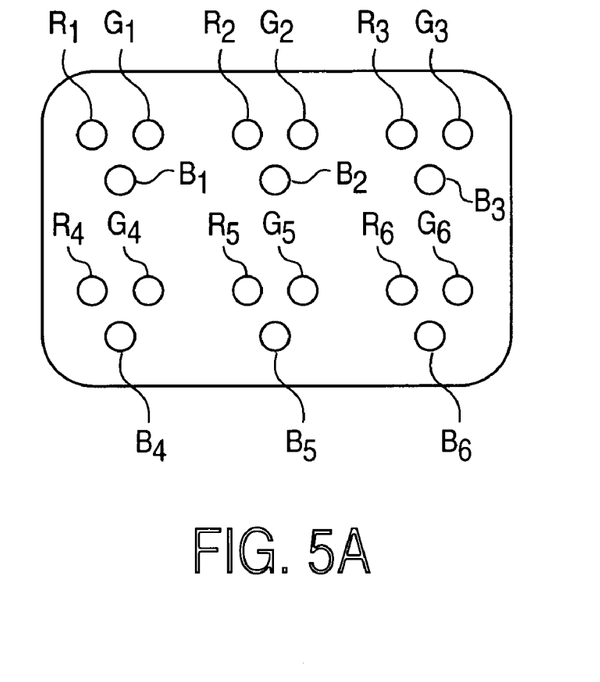
FIGS. 5A-5B show exemplary light modules for imaging systems according to embodiments of the present invention.
Figure 5B:
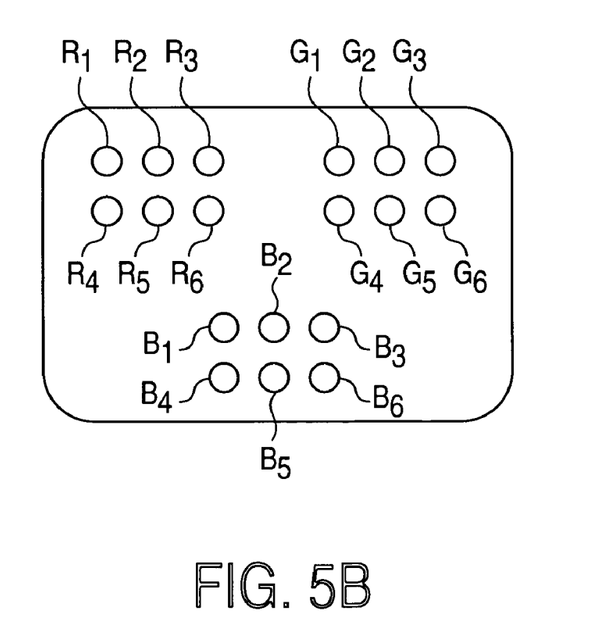

The number and arrangement of emitters is determined to a great extent by the light output of the emitters included in the light module 14 and the needed intensity of the flash light $L_F$. The emitters of each color are intermixed as shown in FIG. 5A, or are grouped in designated color sections as shown in FIG. 5B. Independent accessibility of the different color emitters $R_1$-$R_L$, $G_1$-$G_M$, $B_1$-$B_N$ enables the relative intensities of the different color emitters to be independently varied, which results in the spectral content or color temperature of the flash light $L_F$ provided by the light module 14 being varied.

The relative intensities of the light provided by each of the different color emitters is varied via corresponding variations in the drive signals $S_R$, $S_G$, $S_B$ provided to each of the different color emitters $R_1$-$R_L$, $G_1$-$G_M$, $B_1$-$B_N$, respectively. In the example where the red emitters $R_1$-$R_L$ include one or more red LEDs, the green emitters $G_1$-$G_M$ include one or more green LEDs and the blue emitters $B_1$-$B_N$ include one or more blue LEDs, the drive signals $S_R$, $S_G$, $S_B$ are typically currents provided to the LEDs and the relative intensities of the colored light output of the emitters $R_1$-$R_L$, $G_1$-$G_M$, $B_1$-$B_N$ is varied according to relative magnitudes of the currents that are supplied to activate the different color LEDs. For example, to provide flash light $L_F$ with increased blue intensity, current provided to the blue LEDs is increased relative to the current provided to the green LEDs and the current provided to the red LEDs. Similarly, flash light $L_F$ having different spectral content is provided by relative variations of the currents that are provided to the different color LEDs. To provide the drive signals $S_R$, $S_G$, $S_B$, in this example, the driver 16 includes a series of variable current sources controlled by a control circuit 26 and each coupled to one or more emitters of a corresponding color of the independently accessible different color emitters in the light module 14. The driver 16 can include any other circuit, element or system suitable for modulating the relative intensities of the light provided by each of the different color emitters $R_1$-$R_L$, $G_1$-$G_M$, $B_1$-$B_N$. An example of a method and apparatus for controlling spectral content of different color emitters is provided in U.S. Pat. No. 6,448,550 B1 to Nishimura, and is hereby incorporated by reference. However, any other drive signals $S_R$, $S_G$, $S_B$ or drive schemes suitable for varying the spectral content of the flash light $L_F$ provided by the light module 14 are alternatively included in the imaging system 10.

In the example where the different color emitters each include an array of light sources, such as LEDs, the relative intensities of the different color emitters are alternatively adjustable by corresponding adjustments in the number of light sources within the array that are activated. For example, to provide flash light $L_F$ with decreased blue intensity, current is provided to fewer blue LEDs than the green LEDs or red LEDs, and so on. Thus, in this example the spectral content of the flash light $L_F$ can be adjusted in discrete steps by using switches other suitable circuitry to vary the number of individual emitters of each color that are activated by the drive signals.

Typically, emitters $R_1$-$R_L$, $G_1$-$G_M$, $B_1$-$B_N$ included in the light module 14 have integrated lenses that establish the spatial distribution of the flash light $L_F$ provided by the light module 14. However, reflectors, lenses or other optical elements 28 are optionally included externally to the emitters $R_1$-$R_L$, $G_1$-$G_M$, $B_1$-$B_N$ in the light module 14 to control the spatial distribution of the flash light $L_F$. In the example of FIG. 1, the light module 14 is shown with a lens in front of the emitters $R_1$-$R_L$, $G_1$-$G_M$, $B_1$-$B_N$.

Figure 2:
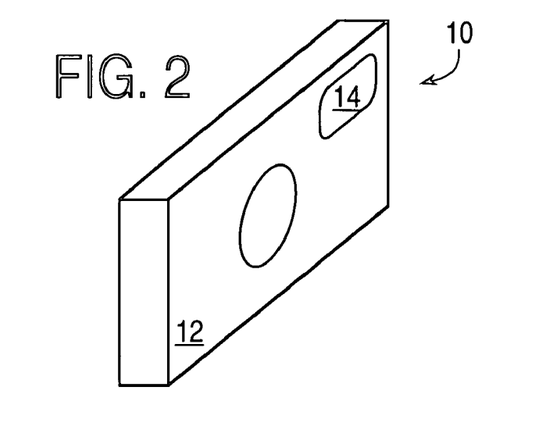
FIGS. 2-4 show exemplary alternative imaging systems according to embodiments of the present invention.
Figure 3:
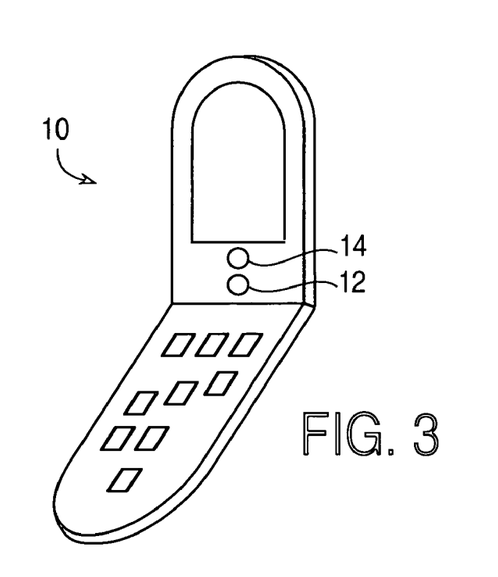
Figure 4:
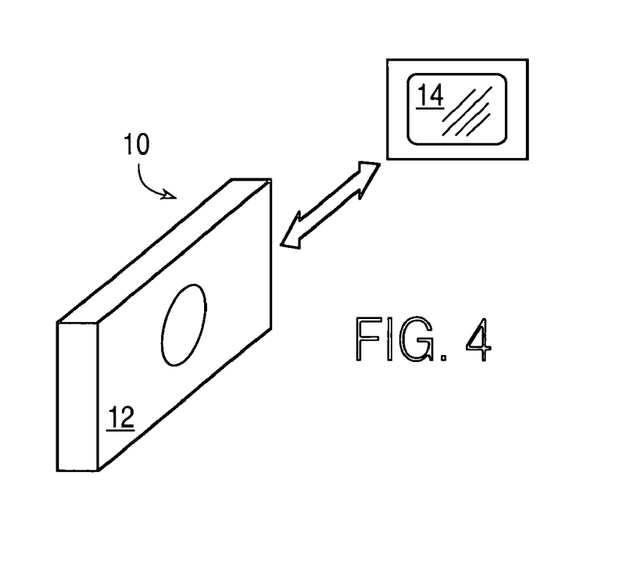

FIG. 2 shows an embodiment of the imaging system 10 wherein the light module 14 and driver 16 are integrated into a conventional camera 12. FIG. 3 shows an embodiment of the imaging system 10 wherein the elements are integrated into a mobile phone. While these embodiments show the light module 14 integrated with the cameras, the light module 14 is alternatively housed separately from the camera 12 in the imaging system 10, to be aimed or otherwise directed to the subject 13 being imaged. The embodiment of the present invention shown in FIG. 4 is directed toward the light module 14 housed separately from the camera 12 and for use in connection with the camera 12. In this embodiment, the driver 16 (not shown) is integrated into the light module 14 or the camera 12, or the driver 16 is separate from the camera 12 and the light module 14.

In addition to adjusting the spectral content or color temperature of the flash light $L_F$ provided by the light source 14, the drive signals $S_R$, $S_G$, $S_B$ provided to the emitters $R_1$-$R_L$, $G_1$-$G_M$, $B_1$-$B_N$ can also adjust the intensity of the flash light $L_F$ provided by the light module 14. The drive signals $S_R$, $S_G$, $S_B$, in this example currents, provided to each of the different color emitters $R_1$-$R_L$, $G_1$-$G_M$, $B_1$-$B_N$ can be collectively increased or decreased to provide corresponding increases or decreases in the intensity of the flash light $L_F$, independent of changes in spectral content of the flash light $L_F$. An example of a method and apparatus for controlling intensity of light from emitters is provided in U.S. Pat. No. 6,344,641 B1 to Blalock et al., and is hereby incorporated by reference. However, any other suitable method or apparatus for adjusting the intensity of the flash light $L_F$ provided by the light source 14 is alternatively used. In the example where the different color emitters each include an array of light sources, such as LEDs, the intensity of the flash light $L_F$ is alternatively adjustable by corresponding adjustments in the number of light sources within each of the arrays that are activated. For example, to provide flash light $L_F$ with decreased intensity, current is provided to correspondingly fewer blue LEDs, fewer green LEDs, and fewer red LEDs.

In one operational mode of the embodiments of the present invention, the spectral content of the flash light $L_F$ provided by the light module 14 is adjusted manually via a hardware or software color control switch $SW_C$ that is coupled to the driver 16. The color control switch $SW_C$ enables separate and independent adjustment of each of the drive signals $S_R$, $S_G$, $S_B$ to each of the emitters $R_1$-$R_L$, $G_1$-$G_M$, $B_1$-$B_N$. For example, the color control switch $SW_C$ enables the drive signal $S_R$ provided to the red emitters $R_1$-$R_L$ to be increased or decreased independent of the drive signal $S_G$ provided to the green emitters $G_1$-$G_M$ or the drive signal $S_B$ provided to the blue emitters $B_1$-$B_N$. Alternatively, the color control switch $SW_C$ enables adjustment of two or more of the drive signals $S_R$, $S_G$, $S_B$ to the emitters in coordination. For example, the color control switch $SW_C$ enables the drive signal $S_R$ provided to the red emitters $R_1$-$R_L$ to be increased or decreased while the drive signal $S_G$ provided to the green emitters $G_1$-$G_M$ is decreased or increased, or while the drive signal $S_B$ provided to the blue emitters $B_1$-$B_N$ is decreased or increased. The intensity of the flash light $L_F$ provided by the light module 14 can also be adjusted manually via a hardware or software intensity control switch $SW_I$ that is coupled to the driver 16. The intensity control switch $SW_I$ typically varies the drive signals $S_R$, $S_G$, $S_B$ to the emitters $R_1$-$R_L$, $G_1$-$G_M$, $B_1$-$B_N$ collectively to change the intensity of flash light $L_F$ independent of the spectral content of the flash light $L_F$.

In an alternative operating mode 40 of embodiments of the present invention (shown in FIG. 6A), the adjustment of spectral content of the flash light $L_F$ provided by the light module 14 is made according to a sensed condition of ambient light $L_A$ that is communicated to the driver 16. In one example, a colorimeter, color-sensitive photo detector, or other color detector 20 senses the spectral content or color temperature of the ambient light $L_A$ (step 42) and communicates the sensed spectral content or color temperature of the ambient light $L_A$ to the driver 16 in the form of a control current or other control signal 17 (step 44). In another example, where the camera 12 is a digital camera, the sensor 22 is used instead of the external color detector 20 shown to sense the spectral content or color temperature of the ambient light $L_A$ (step 42) and communicate the sensed spectral content or color temperature of the ambient light $L_A$ to the driver 16 in the form of a control current or other control signal 17.

Figure 6A:
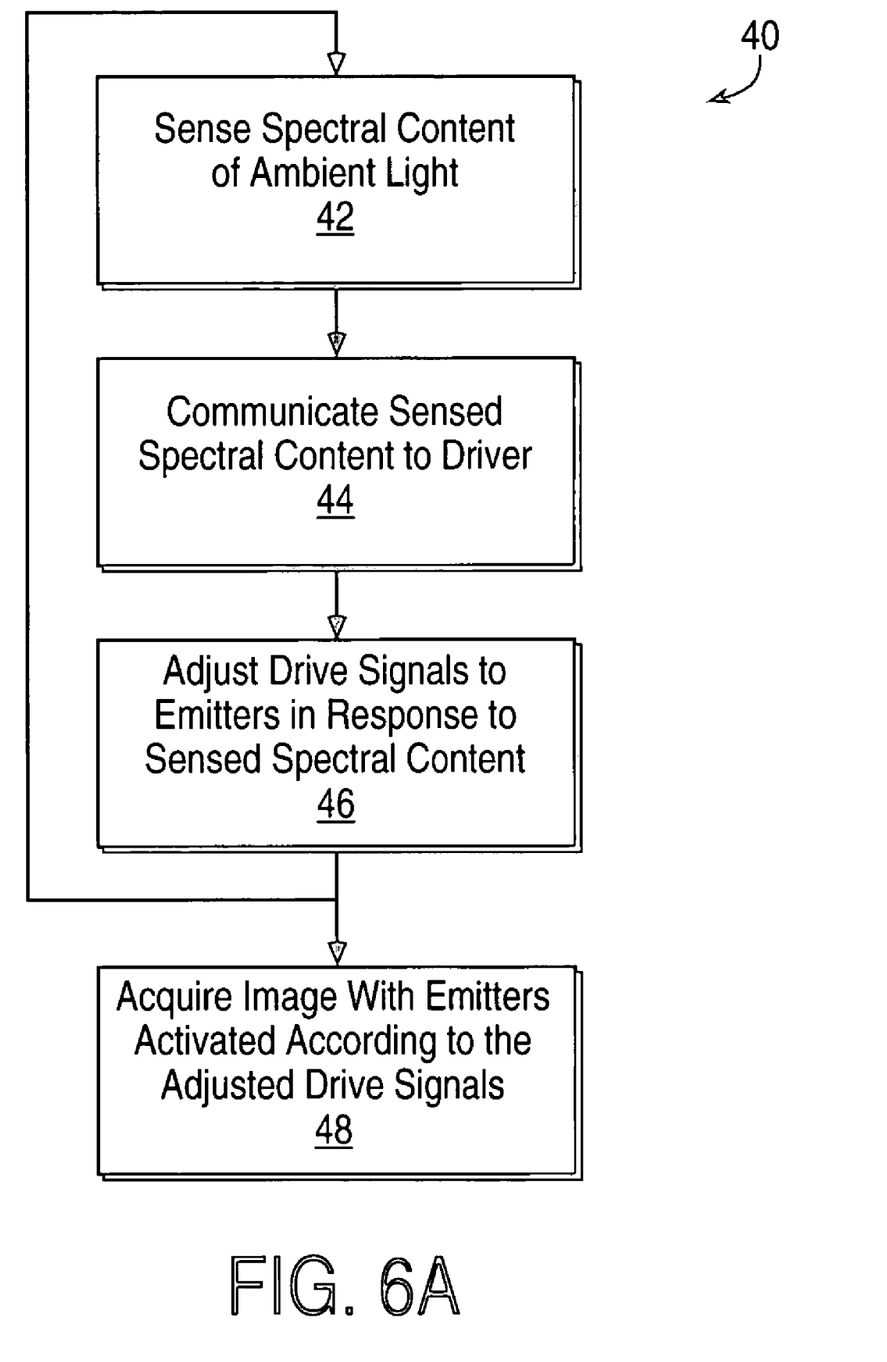
FIGS. 6A-6B show flow diagrams of operating modes of embodiments of the present invention.

In response to the control signal 17, the driver 16 adjusts the drive signals $S_R$, $S_G$, $S_B$ provided to the emitters $R_1$-$R_L$, $G_1$-$G_M$, $B_1$-$B_N$ (step 46). The adjustments to the drive signals $S_R$, $S_G$, $S_B$ are established via a pre-established look-up table that maps values of the control signal 17 to values of the drive signals $S_R$, $S_G$, $S_B$, via curve-fitting or via other techniques that map the values of the control signal 17 to the values of the drive signals $S_R$, $S_G$, $S_B$. An image can be acquired with the emitters activated according to the adjusted drive signals as shown in step 48.

Figure 6B:
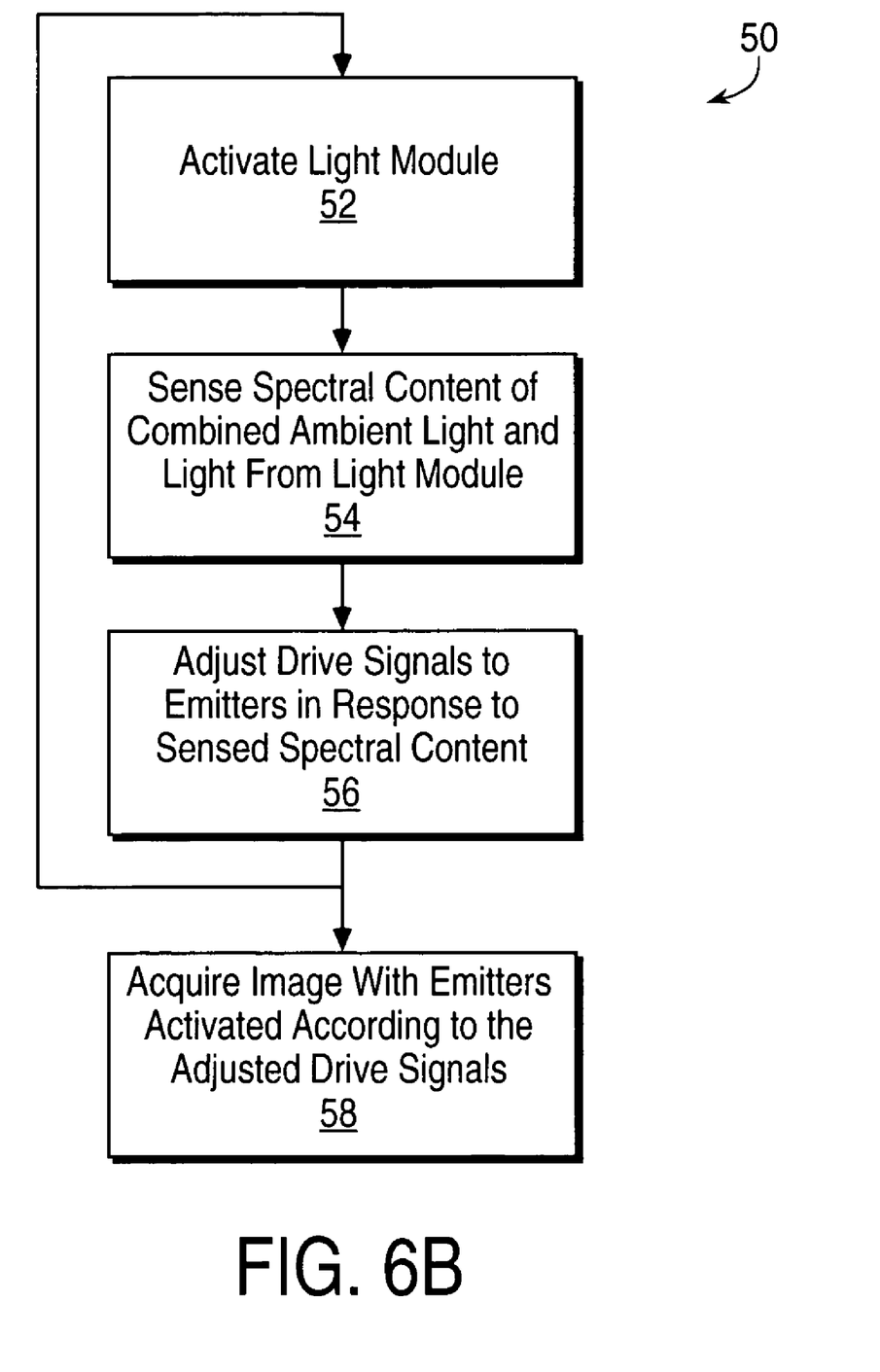

In yet another operating mode 50 of the embodiments of the present invention (shown in FIG. 6B), the light module 14 is activated prior to image acquisitions so that the series of emitters provides the flash light $L_F$ to the subject 13 of an image (step 52). This pre-flash of the light module 14 is sufficiently long for the color detector 20 to sense the spectral content of the combination of the ambient light $L_A$ and flash light $L_F$ provided by light module 14 (step 54). The spectral content of the flash light $L_F$ provided by the light module 14 is then adjusted according to the control signal 17 that is communicated to the driver 16 to form an automatic or semi-automatic color-control feedback system (step 56). In this example, the driver 16 adjusts the drive signals $S_R$, $S_G$, $S_B$ to the emitters $R_1$-$R_L$, $G_1$-$G_M$, $B_1$-$B_N$ in the light module 14 to achieve a target spectral content or color temperature of the combined ambient light $L_A$ and supplemental flash light $L_F$. The target spectral content or color temperature is set by an adjustable color reference signal $REF_C$ in the driver 16. The color reference signal $REF_C$ is typically adjusted via the hardware or software color control switch with the imaging system 10 set to an auto-mode. An image can be acquired with the emitters activated according to the adjusted drive signals, as shown in step 58.

The intensity of the flash light $L_F$ provided by the light module 14 can also be adjusted as part of a feedback loop wherein a control signal from a light meter or other illumination sensor, in one example the sensor 22, is communicated to the driver 16. In response to such control signal, the driver 16 varies the drive signals $S_R$, $S_G$, $S_B$ to the emitters $R_1$-$R_L$, $G_1$-$G_M$, $B_1$-$B_N$ collectively to achieve a target intensity. The target intensity is typically adjusted via the hardware or software intensity control switch $SW_I$ with the imaging system 10 set to an auto-mode that adjusts an intensity reference signal $REF_I$ in the driver 16.

In a typical application of the imaging system 10, the emitters $R_1$-$R_L$, $G_1$-$G_M$, $B_1$-$B_N$ are activated so that the light module 14 produces flash light $L_F$ for the camera 12 during image acquisitions of the subject 13. The duration of the flash light $L_F$ is typically established by pulse modulating the drive signals $S_R$, $S_G$, $S_B$ activating the different color emitters $R_1$-$R_L$, $G_1$-$G_M$, $B_1$-$B_N$. While the amplitudes of each of the drive signals $S_R$, $S_G$, $S_B$ determine the relative color contributions of the particular color emitters to the flash light $L_F$ provided by the light module 14, a pulse of predesignated duration or width determines the time interval during which the emitters are activated. The activation of the emitters to provide flash light $L_F$ is initiated by a trigger TRIG provided to the driver 16 from the camera 12.

While the embodiments of the present invention have been illustrated in detail, it should be apparent that modifications and adaptations to these embodiments may occur to one skilled in the art without departing from the scope of the present invention as set forth in the following claims.

The invention claimed is:

1. An image acquisition system, comprising:
    a light emitting system, comprising:
        a plurality of red light emitters;
        a plurality of green light emitters; and
        a plurality of blue light emitters;
    a driver system, comprising:
        a first set of drivers configured to provide a first set of drive signals for driving each of the plurality of red light emitters;
        a second set of drivers configured to provide a second set of drive signals for driving each of the plurality of green light emitters; and
        a third set of drivers configured to provide a third set of drive signals for driving each of the plurality of blue light emitters;
    a first manual control operable by a user of the image acquisition system to control the driver system for varying an amplitude of at least one of the first, second or third set of drive signals thereby adjusting the spectral content of light emitted by the light emitting system; and
    a second manual control operable by the user to control the driver system for varying the intensity of light emitted by the light emitting system without varying the spectral content.

2. The image acquisition system of claim 1, wherein varying the intensity of light emitted by the light emitting system without varying the spectral content comprises varying the first, second, and third drive signals collectively.

3. The image acquisition system of claim 1, wherein each of the first and second manual controls is a hardware control.

4. The image acquisition system of claim 3, wherein each of the red, green, and blue emitters is a light emitting diode (LED), and wherein each of the first, second, and third drive signals is a current.

5. The image acquisition system of claim 4, wherein varying the intensity of light emitted by the light emitting system without varying the spectral content comprises varying the first, second, and third drive currents collectively thereby keeping the ratio between the red, green, and blue components in the emitted light, constant.

6. The image acquisition system of claim 1, further comprising:
    a color-sensitive photodetector configured to detect a spectral content present in ambient light when the light emitting system is inhibited from emitting light.

7. The image acquisition system of claim 6, further comprising:
    a look-up table configured to map the spectral content present in the ambient light to a set of drive values for generating the first, second, and third set of drive signals for driving each of the plurality of red, green, and blue light emitters.

8. The image acquisition system of claim 7, wherein the look-up table is configured to incorporate a curve-fitting technique for mapping the spectral content present in the ambient light to the set of drive values.

9. The image acquisition system of claim 6, wherein the light emitting system, the driver system, the first manual control, and the second manual control are parts of a digital camera that further comprises an image capture sensor, and wherein the image capture sensor is configured to operate as the color-sensitive photodetector for detecting the ambient level when the light emitting system is inhibited from emitting light.

10. The image acquisition system of claim 6, wherein the light emitting system, the driver system, the first manual control, and the second manual control are parts of a digital camera, and wherein the color-sensitive photodetector is an external module that is coupled to the digital camera.

11. An image acquisition system, comprising:
a light emitting system operable to emit a flash light $L_F$, the light emitting system comprising a set of light emitters, the set of light emitters comprising a first sub-set of red light emitters, a second sub-set of green light emitters, and a third sub-set of blue light emitters;
a multi-functional light sensor, the multi-functional light sensor configurable in a first mode of operation to detect light $L_R$ received from an object to be imaged, and in a second mode of operation to detect ambient light $L_A$ and generate therefrom, a first control signal corresponding to a spectral content present in the detected ambient light $L_A$;
a look-up table that maps each of a plurality of control signal values to a corresponding set of drive values $S_R$, $S_G$, $S_B$ for driving the set of light emitters; and
a driver system configured to receive the first control signal from the multi-functional light sensor and to use the look-up table for identifying a set of drive values that are stored in the look-up table in correspondence to the first control signal, the driver system further configured to use the identified set of drive values for configuring the first sub-set of light emitters to emit red light at a first intensity, and the second sub-set of light emitters to emit green light at a second intensity that is different than the first intensity.

12. The image acquisition system of claim 11, wherein the light emitting system is configured to inhibit the emission of the flash light $L_F$ during the second mode of operation.

13. The image acquisition system of claim 11, wherein configuring the first sub-set of light emitters to emit red light at a first intensity comprises activating a first number of red light emitters, and configuring the second sub-set of light emitters to emit green light at a second intensity comprises activating a second number of green light emitters, wherein the second number is different than the first number.

14. The image acquisition system of claim 11, wherein configuring the first sub-set of light emitters to emit red light at a first intensity comprises providing a first drive signal for driving a first number of red light emitters, and configuring the second sub-set of light emitters to emit green light at a second intensity comprises providing a second drive signal for driving a second number of green light emitters, wherein the second number is the same as the first number and wherein the second drive signal is different than the first drive signal.

15. The image acquisition system of claim 11, further comprising an intensity control that is operable to collectively vary the overall intensity of the emitted light without varying the ratio between the emitted red light and green light.

16. A method of image acquisition using an image acquisition system, the method comprising:
emitting a pre-flash of light $L_F$ from the image acquisition system;
sensing a spectral content of ambient light during the pre-flash emission, thereby obtaining a sensed spectral content measurement comprising a combination of ambient light $L_A$ and the pre-flash of light $L_F$;
emitting thereafter, a flash of light from the image acquisition system, the emitting comprising:
using the sensed spectral content measurement to determine a pre-flash control signal value;
identifying a set of drive signal values by referring the pre-flash control signal value against a look-up table that maps each of a plurality of control signal values to a corresponding plurality of drive signal values $S_R$, $S_G$, $S_B$;
using the set of drive signal values for driving a plurality of light emitters that generate colored light having a spectrum that compensates for an undesirable spectral characteristic of the ambient light $L_A$, wherein driving the plurality of light emitters comprises:
providing a first sub-set of drive signals that configure each of a first sub-set of the light emitters to emit light of a first color at a first intensity; and
providing a second sub-set of drive signals that configure each of a second sub-set of the light emitters to emit light of a second color at a second intensity that is different than the first intensity; and
acquiring an image of an object illuminated by the generated color light.

17. The method of claim 16, wherein the undesirable spectral characteristic of the ambient light comprises one of an undesired color content or an undesired color temperature.

18. The method of claim 17, wherein the ambient light is daylight and the undesired color temperature is a cooler temperature of daylight.

19. The method of claim 16, wherein a light sensor is used at a first instant for sensing the spectral content in ambient light and thereafter, the light sensor is again used at a second instant, for acquiring the image of the object.

* * * * *